Nov. 12, 1963  C. D. JONES  3,110,382
SYNCHRONIZER CLUTCH MECHANISM
Filed Oct. 23, 1961  4 Sheets-Sheet 1

INVENTOR:
CLEVOE D. JONES
BY
ATTORNEYS

Nov. 12, 1963  C. D. JONES  3,110,382
SYNCHRONIZER CLUTCH MECHANISM
Filed Oct. 23, 1961  4 Sheets-Sheet 2

INVENTOR:
CLEVOE D. JONES
BY
ATTORNEYS

Nov. 12, 1963  C. D. JONES  3,110,382
SYNCHRONIZER CLUTCH MECHANISM
Filed Oct. 23, 1961  4 Sheets-Sheet 3

INVENTOR:
CLEVOE D. JONES
BY
ATTORNEYS

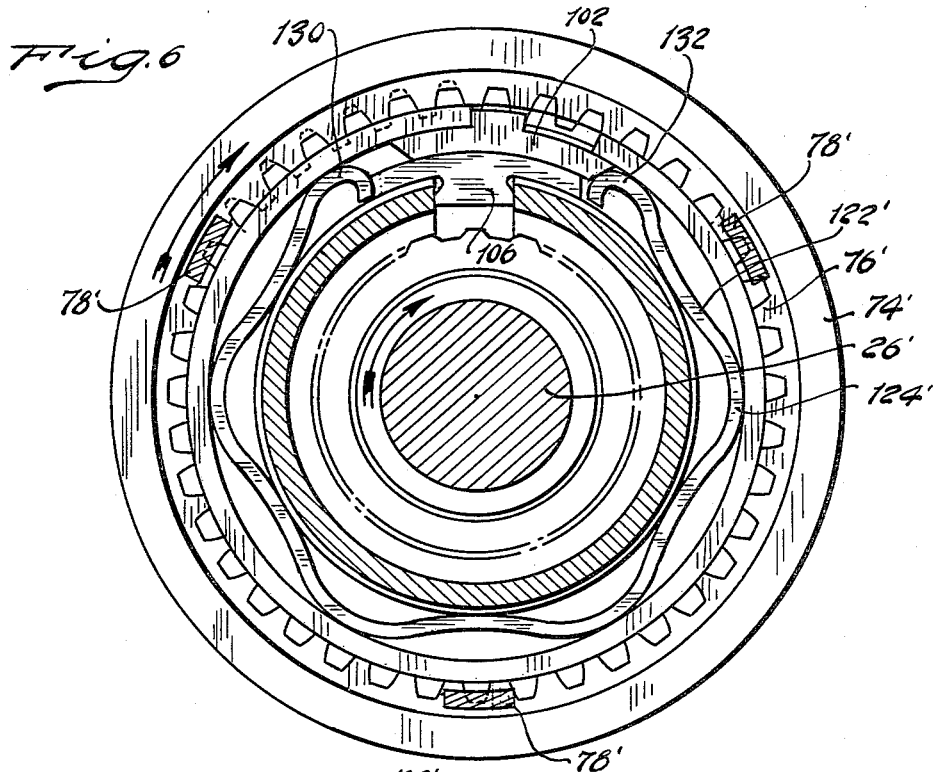
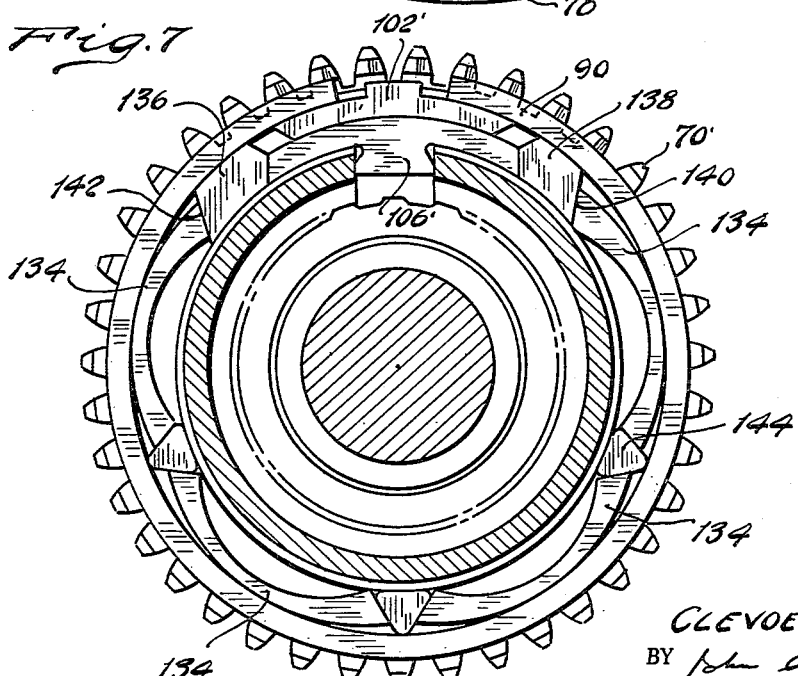

United States Patent Office 3,110,382
Patented Nov. 12, 1963

3,110,382
SYNCHRONIZER CLUTCH MECHANISM
Clevoe D. Jones, Franklin, Mich., assignor to Ford Motor Company, Dearborn, Mich., a corporation of Delaware
Filed Oct. 23, 1961, Ser. No. 146,845
10 Claims. (Cl. 192—53)

My invention relates generally to clutch mechanisms, and more particularly to a synchronizer clutch mechanism capable of controlling the engagement of two positively engageable clutch elements that form a part of a torque delivery path between a driving member and a driven member.

The improvement of my invention can be adapted readily for use with a manually controlled, multiple speed power transmission mechanism. Such mechanisms often are employed in wheeled automotive vehicles to form a part of the torque delivery path between the vehicle engine and the vehicle traction wheels. A neutral clutch normally is situated between the engine crankshaft and the power input shaft for the transmission mechanism and can be engaged and disengaged by the vehicle operator to interrupt the driving torque. This makes it possible to change the relative motion of gears to condition the transmission mechanism for a speed ratio change.

In one structural environment for my invention, a power input shaft and a power output shaft of the transmission mechanism are situated on a common axis. A cluster gear assembly is disposed about the axis of a countershaft located in spaced parallel relationship with respect to the power input and power output shafts. A power input gear is connected drivably to the power input shaft and is in continuous engagement with one gear element of the cluster gear assembly. Other gears of the mechanism are mounted rotatably upon the power output shaft and are in continuous meshing engagement with other gear elements of the cluster gear assembly. The improved synchronizer clutch construction of my invention can be employed for clutching selectively the power output shaft to either one or the other of a pair of gears mounted for rotation about it. This establishes either a low driving speed ratio or a so-called intermediate driving speed ratio. Another synchronizer clutch element embodying the principles of my invention can be used for clutching selectively the power output shaft to the power input gear thus establishing a direct driving connection between the power input shaft and the power output shaft.

The synchronizer clutch construction of my invention functions to synchronize the motion of the gears that are coaxially mounted for rotation about the axis of the power input and power output shafts prior to engagement of positive clutching elements that establish a locking connection between these gears and the power output shaft. This synchronization is established within a minimum shift time interval and is accomplished with a minimum degree of driver effort.

The provision of a synchronizer clutch mechanism of the type generally described above being a principal object of my invention, it is a further object of my invention to provide a synchronizer clutch construction that is capable of establishing cushioned engagement of two positive clutching elements in a geared torque delivery path and also establishing synchronism between them prior to clutching engagement.

It is a further object of my invention to provide a clutch mechanism of the type above set forth wherein the synchronizing action is established in response to shifting motion of one clutch element toward the other and wherein the effort required to establish this shifting action is augmented by a self-energizing action of the synchronizer clutch mechanism to reduce the shift time interval and to cushion engagement of the positive clutching elements.

It is a further object of my invention to provide a synchronizer clutch mechanism having positively engageable clutch elements that can be moved into and out of engagement in response to an externally applied shifting force and wherein a split synchronizer clutch ring is situated between the clutching elements, said synchronizer clutch ring having a friction surface that is engageable with the shiftable clutch elements whereby tangential synchronizing forces are established when a differential speed exists between the driving and driven members.

It is a further object of my invention to provide a clutch construction of the type set forth above wherein the synchronizing tangential forces are augmented by the self-energizing action of the synchronizer mechanism.

It is a further object of my invention to provide a synchronizer of the type set forth above wherein provision is made for applying an outwardly directed radial force to the synchronizer ring, the magnitude of which is related functionally to the externally applied tangential force on the synchronizer ring, and wherein the outwardly directed forces are distributed uniformly throughout the inner periphery of the ring.

It is a further object of my invention to provide a synchronizer of the type set forth above wherein provision is made for prestressing the synchronizer ring thus improving the shift quality during a shift sequence.

It is a further object of my invention to provide a synchronizer of the type set forth above that is characterized further by its simplified construction and a minimum number of component elements.

Further objects and features of my invention will become apparent from the following particular description and from the accompanying drawings, wherein:

FIGURE 6 is a view similar to FIGURE 4 showing a second embodiment of my invention; and FIGURE 7 is a view similar to FIGURE 4 showing a third embodiment of my invention.

Figure 1:
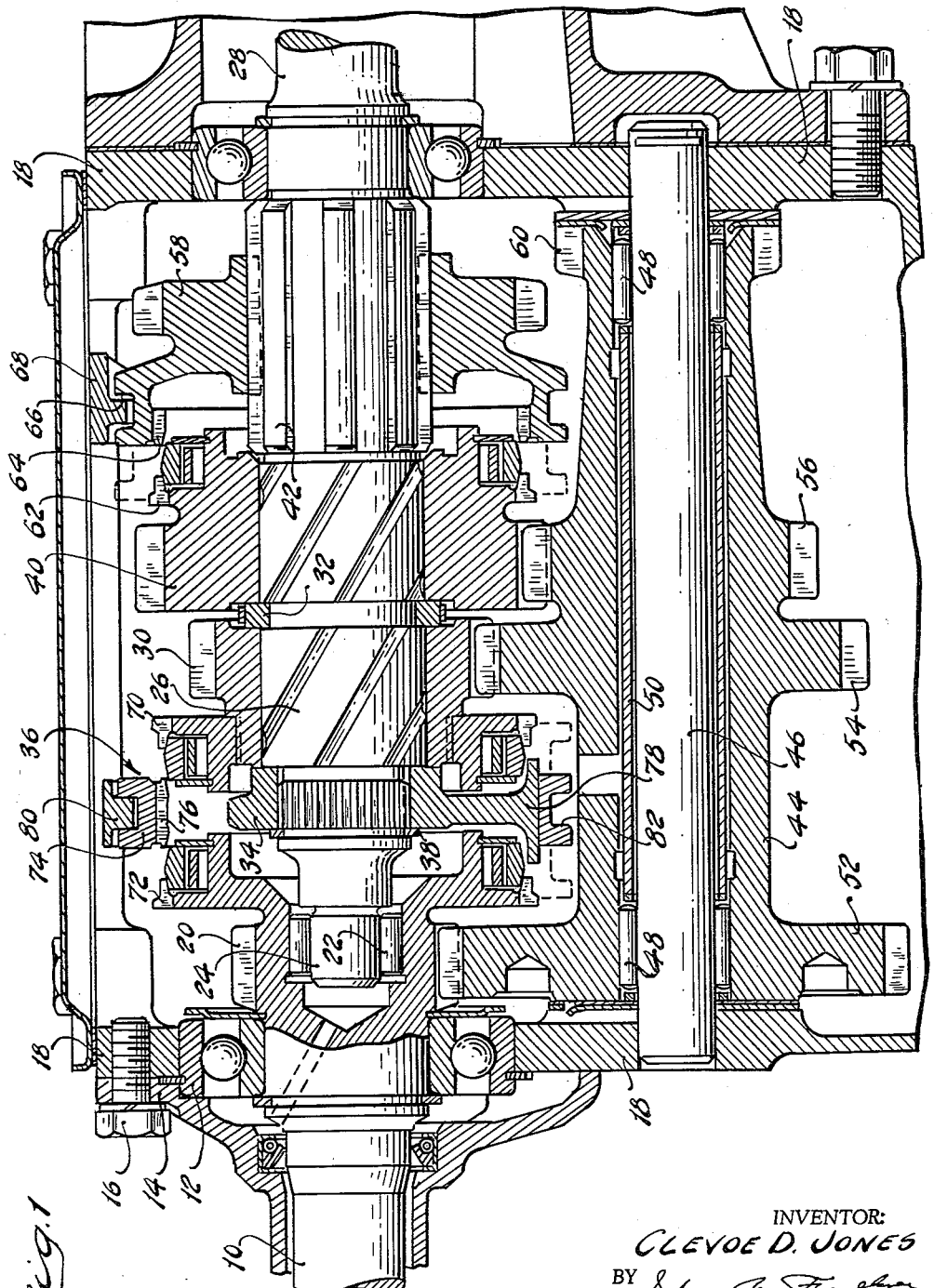
FIGURE 1 is a cross sectional assembly view of a transmission mechanism embodying the improved synchronizer construction of my invention.

Referring first to FIGURE 1, numeral 10 designates the power input shaft for the transmission mechanism. It is journaled within a suitable bearing 12 received within a cooperating bearing opening formed in a cover plate 14 that forms a part of the transmission housing. Cover plate 14 is secured by bolts 16 to the transmission housing 18. A power input gear 20 is formed integrally on the shaft 10 and is recessed as indicated to receive a pilot bearing 22 for a reduced diameter portion 24 of an intermediate shaft 26. This shaft forms an extension of a power output shaft shown at 28.

A gear 30 is journaled rotatably upon shaft 26 and is held axially fast by a split retainer ring 32 located in a cooperating groove in shaft 26 and by a hub 34 for a synchronizer clutch assembly 36. Hub 34 is retained by snap ring 38 upon shaft 26.

Another gear 40 is journaled rotatably upon shaft 26 and is held axially fast by the aforementioned split retainer ring 32 and by a cooperating shoulder defined by a relatively large diameter splined portion 42 for the shaft 26.

A cluster gear assembly is identified generally by reference character 44. It is journaled for rotation about a countershaft 46 that is end supported as shown in spaced portions of the housing 18. Bearings 48 are provided for journaling the cluster gear assembly 44. A suitable spacer 50 is located between the spaced bearing elements 48.

The cluster gear assembly 44 includes a gear element 52 that drivably engages power input gear 20. Another gear element 54 of the cluster gear assembly 44 continuously engages gear element 30. Similarly, gear element 56 drivably engages gear element 40.

A reverse gear 58 is splined to portion 42 of shaft 26. It can be shifted in an axial direction although rotation of the gear 58 relative to the shaft 26 is inhibited. A reverse idler, not shown, drivably engages the reverse pinion 60 formed on the cluster gear assembly 44. When the reverse gear 58 is shifted in a right-hand direction as viewed in FIGURE 1, the reverse pinion is engaged by its gear teeth thus establishing a reverse torque delivery path between the power input shaft and the power output shaft.

The gear 40 has formed thereon a clutch element having external clutch teeth 62 and the gear element 58 has a clutch element with internal clutch teeth 64 formed thereon. The clutch element for gear 58 is formed with an external groove 66 to accommodate a shifter fork 68. The fork 68 can be moved axially with respect to the axis of the shafts 10 and 28 to move the gear 58 into engagement with the reverse drive pinion or in a left-hand direction as viewed in FIGURE 1 so that the teeth 64 drivably engage teeth 62 to establish a driving connection between gear 40 and shaft 26.

Gear 30 also is formed with a clutch element having external clutch teeth 70 and gear 20 similarly is formed with a clutch element having clutch teeth 72. An axially slidable sleeve 74 is mounted upon the aforementioned hub 34 and is formed with internal teeth 76 that selectively engage teeth 70 or 72 depending upon the direction sleeve 74 is shifted. Hub 34 includes at least three webbed portions 78 that provide support for the sleeve 74 and guide it during axial shifting movement. This shifting movement is accomplished by a shifter fork 80 received within a cooperating groove 82 formed in sleeve 74.

To establish low speed operation, gear 58 is moved in a left-hand direction thus locking gear 40 to the shaft 26. The power flow path for the engine torque thus is defined by shaft 10, gear 20, gear element 52, gear element 56, gear 40, shaft 26 and shaft 28. To establish intermediate speed operation, gear 58 is shifted again to the position shown in FIGURE 1, and sleeve 74 is moved in a right-hand direction as viewed in FIGURE 1 thus locking gear 30 to the shaft 26.

The intermediate speed ratio power flow path is defined by shaft 10, gear 20, gear element 52, gear element 54, gear 30, shaft 26 and shaft 28.

To condition the transmission for direct drive or high speed operation, sleeve 74 is shifted in a left-hand direction thus releasing gear 30 from its driving connection with shaft 26 and connecting gear 20 to the shaft 26 directly. The driving torque thus is transferred directly from shaft 10 to shaft 26 and hence to shaft 28.

The synchronizer clutch construction of my invention can be used to synchronize the motion of the gears 40 and 58 prior to engagement of the clutch teeth 62 and 64 or to synchronize the speed of rotation of the shaft 26 relative to the speed of gears 20 or 30 prior to clutching engagement of the clutch teeth 56 with teeth 72 or 70, respectively.

Figure 3:
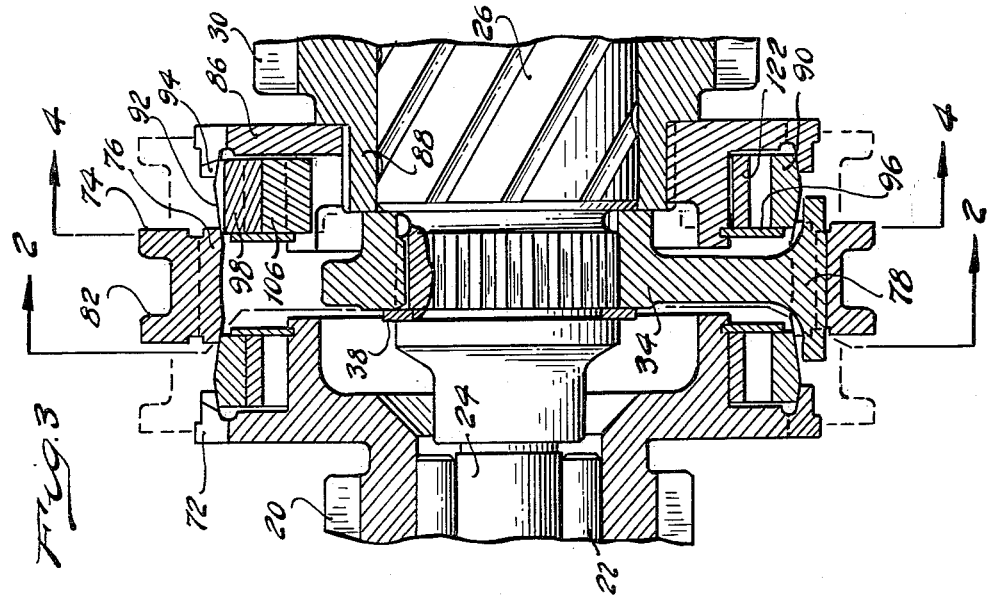
FIGURE 3 is an enlarged view of a portion of FIGURE 1 showing the mode of cooperation of my improved synchronizer clutch construction and the gear elements of the transmission of FIGURE 1.
Figure 2:
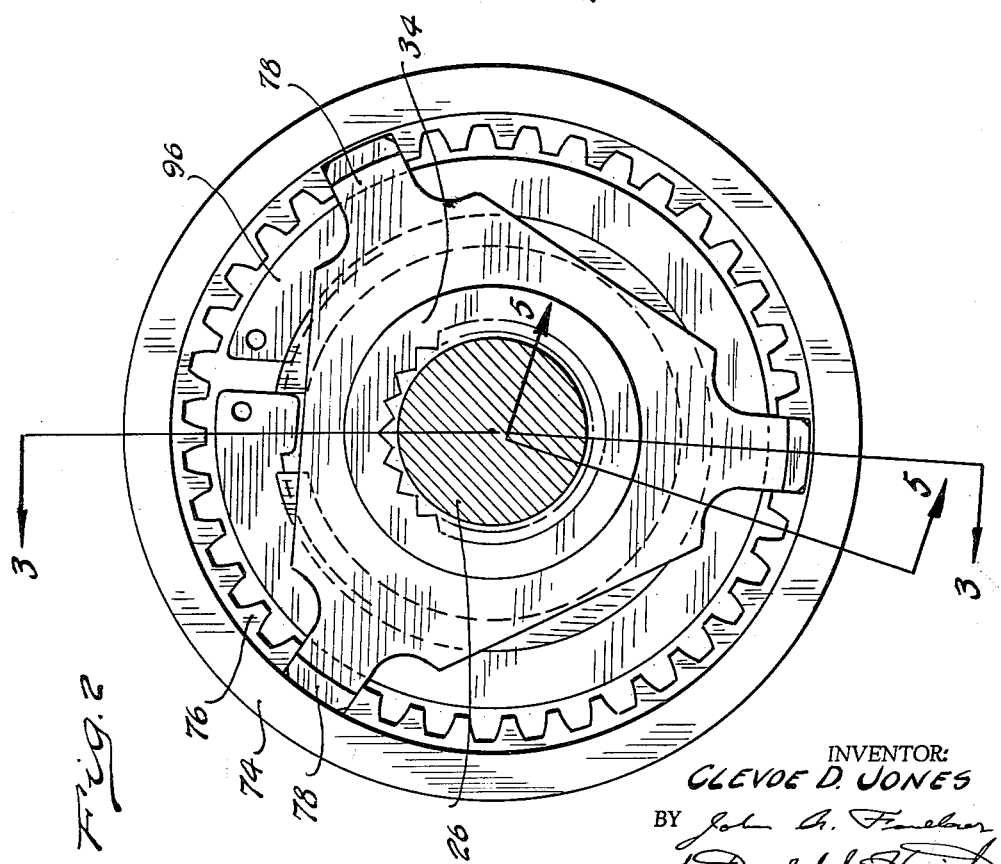
FIGURE 2 is a cross sectional view of my improved synchronizer clutch construction and is taken along section line 2—2 of FIGURE 3.
Figure 4:
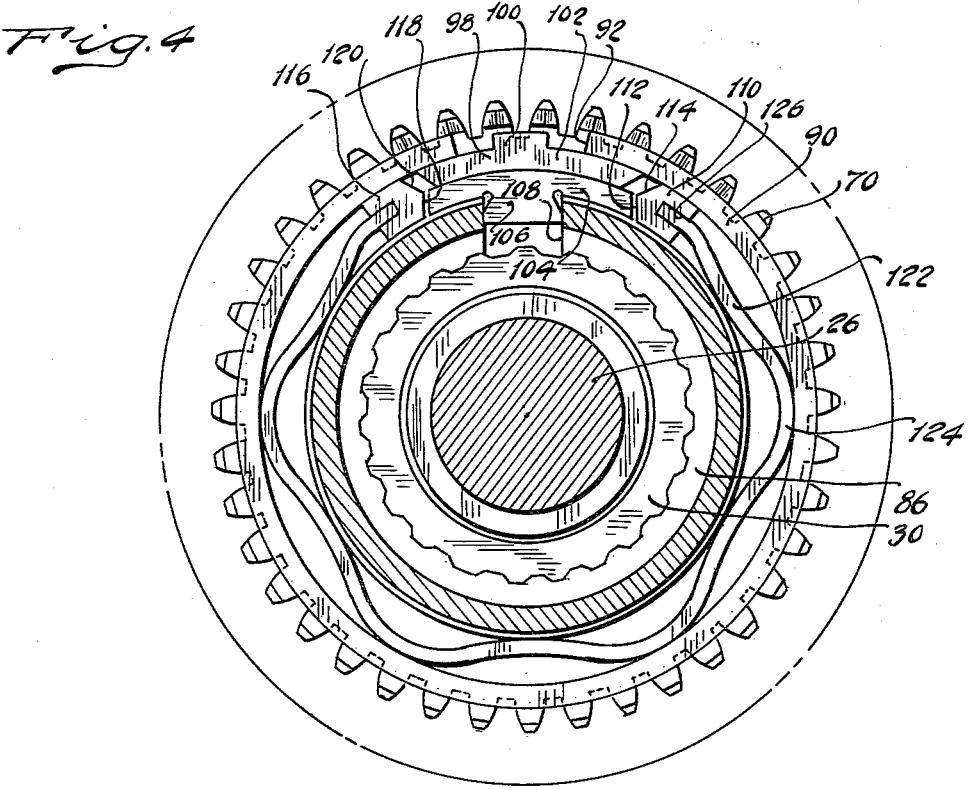
FIGURE 4 is a tranvserse cross sectional view of the synchronizer construction of FIGURE 3 taken along section line 4—4 of FIGURE 3.

Referring next to FIGURES 2, 3 and 4, my improved synchronizer construction is illustrated in more particular detail. For purposes of the present description, the synchronizer clutch mechanism associated with the gear 30 will be described although it will be appreciated that the other synchronizer mechanisms are similar in construction.

The clutch element upon which the teeth 70 are formed is identified in FIGURE 3 by reference character 86. It is splined to an extension 88 formed on the gear 30. A split synchronizer ring is shown at 90 and it is formed with tapered friction surfaces 92 on its outer periphery.

As best seen in FIGURE 4, the synchronizer ring 90 is split to form a gap at 92. In the embodiment shown, the clutch teeth 70 are formed with a pilot extension 94 that engages one of the friction surfaces 92 to maintain the ring in a fixed position.

A snap ring 96 is received within a snap ring groove in the member 86 and maintains the ring 90 in an assembled position.

As best seen in FIGURE 4, an abutment that is shaped like an anvil is identified by reference character 98 and includes a portion 100 situated in the gap 92 for the synchronizer ring 90. It includes also an arcuate body portion 102 having a curvature at its outer surface that equals substantially the curvature of the inner surface of the synchronizer ring 90. The curvature of the inner surface of the anvil body portion 102 is equal substantially to the curvature of the outer surface of a body portion 104 for an anchor member 106. This anchor member includes a portion that is positioned within a slot 108 formed in the member 86.

It will be apparent from an inspection of FIGURE 4 that the body portion 102 for the anvil 98 is somewhat shorter in arcuate extent than the body portion 104 of the anchor 106. Anvil 98 is capable of moving relative to the anchor 106 in a peripheral direction.

A shoe 110 is situated in the arcuate spaced formed between the inner surface of the synchronizer ring 90 and the outer surface of the member 86. This shoe is formed with a radial dimension substantially the same as the radial dimension of the annular space in which it is received. It includes a first surface 112 that is engageable with the end of the arcuate body portion 104 of the anchor 106. It includes also a surface 114 that is engageable by the end of the arcuate body portion 102 of the anvil 98.

Another shoe is positioned as shown at 116. It is similar in form to the shoe 110 and has a surface 118 that is engageable with one end of the body portion 104 of the anchor 106 and another surface 120 that is engageable with an end of the arcuate body portion 102 of the anvil 98.

Positioned within the arcuate space between the synchronizer ring 90 and the member 86 is an undulated spring 122 having apex portions 124 engageable with the inner surface of the synchronizer ring 90. The portions intermediate the apices 124 engage the outer surface of the cooperating member 86. One end of the spring 122 is received within a slot 126 formed in the shoe 110. The other shoe 116 is recessed similarly to receive the other end of the spring 122. The spring 122 can be prestressed during assembly to provide a preload acting in a radial direction on the synchronizer ring 90.

Figure 5:
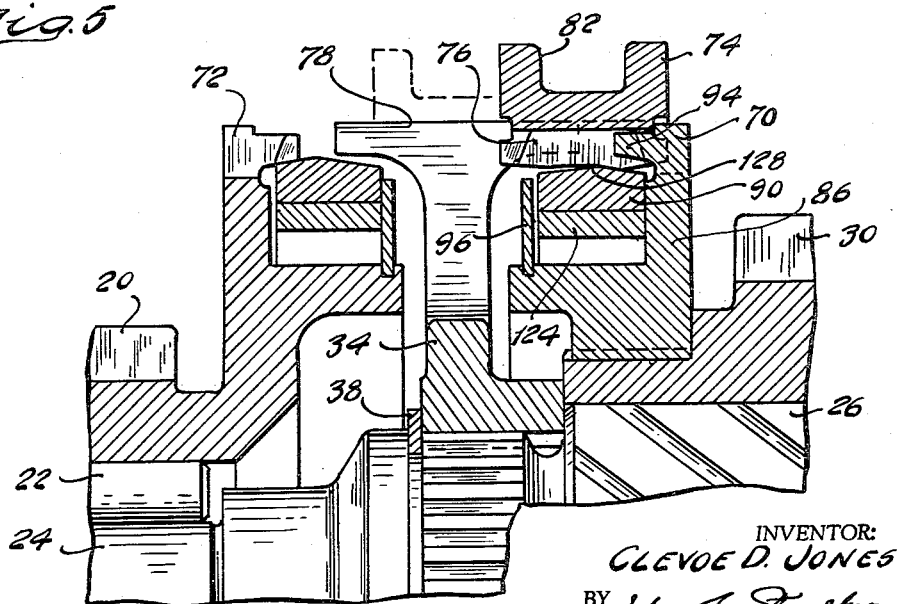
FIGURE 5 is a view similar to FIGURE 3 showing the synchronizer clutch sleeve in one of its two operating positions.

In FIGURE 5 there is shown one operative position for the synchronizer clutch sleeve 74. When it assumes this position, clutching engagement is established between clutch teeth 70 and clutch teeth 76 thereby connecting gear 30 to the shaft 26. When the sleeve is shifted from the position shown in FIGURE 3 to the position shown in FIGURE 5, the inner periphery of the teeth 76 engage the outer periphery of synchronizer ring 90 thus establishing tangential friction forces on the surfaces 92. The ring 90 is contracted radially by the sleeve 74 when the teeth 76 engage it. If it is assumed for purposes of discussion that the speed of rotation of the shaft 26 exceeds the speed of rotation of gear 30, and if it is assumed further that shaft 26 travels in the direction of the arrow shown in FIGURE 4, then a clockwise tangential force is transmitted to the synchronizer ring 90 as it is radially contracted. The ring 90 then is shifted in a clockwise direction until it engages abutment portion 100 of the anvil 98. This causes the anvil 98 to shift upon the anchor 106 until the right-hand end of the body portion 102 thereof engages the surface 14 of the shoe 110. A tangential force then is applied to the spring 122 and this force is transmitted by the spring to the shoe 116 thus causing surface 118 to engage the left-hand end of the body portion 104 of the anchor 106. The tangential force is transferred through the anchor 106 to the member 86, the latter in turn being positively connected to the gear 30 as indicated previously. This tangential force will be applied whenever relative motion takes place between shaft 26 and gear 30. The gear 30 thus will be caused to accelerate. Acceleration continues until the speed of gear 30 is in synchronism with the speed of shaft 26.

When this synchronism is established, the sleeve 74 can be shifted to the position shown in FIGURE 5. The inner periphery of the teeth 76 is recessed as shown at 128. When the sleeve 74 assumes the position shown in FIGURE 5, the recess 128 is engaged by the apex defined by the friction surfaces 92 and 94 on the synchronizer ring 90. This produces a so-called detent action that resists disengaging motion of the sleeve 74 once engagement has been established.

During the shift interval the tangential forces transferred through the spring 122 produce radial expansion forces that act upon the synchronizer ring 90. These expansion forces are distributed uniformly throughout substantially the entire arcuate extent of the synchronizer ring. The magnitude of these radial expansion forces is related functionally to the magnitude of the friction forces established by the clutch teeth 76 on the friction surfaces 92 and 94. This in turn augments the synchronizing action since the tangential forces are in turn dependent upon the magnitudes of the radial forces and the reaction forces between the teeth 76 and the synchronizer ring 90. This produces a so-called self-energizing action that reduces the total shift time interval for any given applied force upon the sleeve 74.

If the speed of rotation of the gear 30 were to exceed the speed of rotation of the shaft 26 prior to clutching engagement of the teeth 76 and the teeth 70, then the anvil 98 would be urged in a counterclockwise direction by the synchronizer ring 90. The left-hand end of the body portion 102 and the anvil 98 thus will engage the shoe 116 rather than the shoe 110, the tangential force being transferred through the spring 122 in a counterclockwise direction rather than a clockwise direction as previously described. This counterclockwise force is transferred through the body portion 104 of the anchor 106 when the right-hand end thereof is engaged by surface 112 of the shoe 110. The reaction force then is transferred to the gear 30 to decelerate the gear until synchronism is established between shaft 26 and gear 30.

Regardless of which direction the synchronizing forces are distributed through the spring 122, it exerts a uniform radial expansion force upon the synchronizer ring thus allowing uniform wear of the synchronizer ring to take place. This produces longer life of the synchronizer construction and at the same time improves the shift quality by reducing the shift time interval and by cushioning to a maximum degree the engagement of the teeth 76 and 70.

In FIGURE 6 I have shown a modified form of my invention. It comprises each of the elements previously described except that the spring identified by reference character 122' has ends that are curved as indicated at 130 and 132. The curved ends 130 and 132 replace the previously described shoes 116 and 114, respectively. In other respects the spring 122' is similar in geometry and function to the previously described spring 122.

When a tangential force is applied to the synchronizer ring in a clockwise direction as viewed in FIGURE 6, anvil 98 engages the end 132 of the spring 122' and a tangential force is transmitted through the spring to the end 130, the latter engaging the left-hand end of the body portion 104 of the anchor 106. A thrust force thus is transferred to the gear 30 through the member 86 in the direction of the arrow as shown in FIGURE 6.

If the tangential force applied to the synchronizer ring 90 is in the opposite direction, the anvil 98 will engage the end 130 of the spring 122' and the end 132 thus will engage the right-hand end of the body portion 104 of the anchor 106. A synchronizing force thus is applied to the gear 30 in a counterclockwise direction as viewed in FIGURE 6.

In FIGURE 7 I have shown a third embodiment of my invention. It also is similar to the construction described with reference to FIGURES 1 through 5 although the synchronizer spring is replaced by a series of expansible arcuate segments shown at 134. Also, the shoes 116 and 110 are replaced by shoes 136 and 138, respectively. The right-hand end of body portion 104 of the anchor 106 is adapted to engage one side of the shoe 138 and the left-hand end of the body portion 104 is adapted to engage the shoe 136. These same shoes can be engaged by the right-hand end and the left-hand end, respectively, of the body portion 102 and the anvil 98.

Shoe 138 is formed with a surface 140 that is engageable with one of the adjacent arcuate segments 134 and shoe 136 is formed with a surface 142 that is engageable with its adjacent arcuate segment 134. Three spacers 144 are situated between the adjacent arcuate segments 134. They are formed with obliquely positioned thrust surfaces that engage the ends of the arcuate segments 134. The width of the spacers 144 and the segments 134 can be equal to or less than the axial width of the synchronizer ring 90.

During operation the synchronizer ring 90 can be shifted in either a clockwise direction or a counterclockwise direction depending upon the direction of relative rotation of the clutch elements. If the tangential forces acting on the synchronizer ring 90 are in a clockwise direction as viewed in FIGURE 7, the anvil 98 will be shifted in a clockwise direction until it engages the shoe 138. The tangential force thus transmitted to the shoe 138 is transmitted through the series of arcuate segments 134 and the spacer elements 144 thus causing the shoe 136 to be shifted in a clockwise direction into engagement with the left-hand end of the anchor 106. The arcuate segments 134 and the spacers 144 thus function in a manner similar to the springs 122 and 122' in the embodiment previously described. The arcuate segments 134 are flexible and when a tangential force is transmitted through them they exert a radial expansion force upon the synchronizer ring 90 thus creating a self-energizing clutching action that is characteristic of the earlier embodiments. It is capable of providing also radial expansion forces that are uniformly distributed throughout substantially the entire arcuate extent of the synchronizer ring 90. This, as previously explained, reduces wear to a minimum and improves the over-all shift quality.

Having thus described preferred embodiments of my invention, what I claim and desire to secure by United States Letters Patent is:

1. In a synchronizer clutch assembly adapted to form a releaseable driving connection between driving and driven members, a first clutch element carried by one of said members, a second clutch element carried by the other of said members, a split synchronizer ring disposed adjacent said first clutch element, said second clutch element being movable into frictional engagement with said synchronizer ring when it is moved toward said second clutch element whereby tangential friction forces are transmitted thereto, and means for transferring said friction forces to said first clutch element including flexible portions located within said synchronizer ring and yieldable radially in response to the tangential forces applied thereto whereby supplementary radial synchronizer forces are applied to said synchronizer ring at angularly spaced locations throughout substantially the entire arcuate extent of said synchronizer ring, the magnitude of said radial forces being proportional to said tangential friction forces.

2. In a synchronizer clutch assembly adapted to form a releaseable driving connection between driving and driven members, a first clutch element carried by one of said members, a second clutch element carried by the other of said members, a split synchronizer ring disposed adjacent said first clutch element, said second clutch element being movable into frictional engagement with said synchronizer ring when it is moved toward said second clutch element whereby tangential friction forces are transmitted thereto, a first abutment having portions located between the ends of said synchronizer ring, a second abutment positioned adjacent said first abutment at substantially the same angular position with respect to the axis of said ring, said second abutment being connected to said first clutch element, and means for transferring friction forces to said first clutch element including yieldable force transmitting portions located within said synchronizer ring and between said abutments whereby the forces acting upon said ring are transmitted to said one member to establish synchronism between said members prior to engagement of said clutch elements.

3. In a synchronizer clutch assembly adapted to form a releaseable driving connection between driving and driven members, a first clutch element connected to one of said members and having formed thereon external clutch teeth, a second clutch element connected to the other of said members and having formed thereon internal clutch teeth, a split synchronizer ring disposed adjacent said first clutch element, means for adjustably positioning said second clutch element axially into clutching engagement with said first clutch element, said second clutch element being engageable with the periphery of said synchronizer ring thereby establishing tangential friction forces, and means for transferring said friction forces to said first clutch element including radially flexible portions located within said synchronizer ring and yieldable radially in response to the application thereto of said tangential forces whereby supplementary radial synchronizer forces are applied to said synchronizer ring at angularly spaced locations throughout the entire arcuate extent of said synchronizer ring, the magnitude of said radial forces being proportional to said tangential friction forces.

4. In a synchronizer clutch assembly adapted to form a releaseable driving connection between driving and driven members, a first clutch element connected to one of said members and having formed thereon external clutch teeth, a second clutch element connected to the other of said members and having formed thereon internal clutch teeth, a split synchronizer ring mounted adjacent said first clutch element, said second clutch element being axially movable into clutching engagement with said first clutch element, said second clutch element being engageable with the periphery of said synchronizer ring when it is adjusted toward said first clutch element whereby tangential friction forces are established on said ring, a first abutment having portions located between the ends of said synchronizer ring, a second abutment located adjacent the first abutment and positioned substantially in the same arcuate position as said first abutment relative to the axis of said ring, said second abutment being connected to said first clutch element, and means for transferring the friction forces of said ring from said first abutment to said second abutment including radially yieldable portions between said abutments that apply radial pressure to said synchronizer ring throughout substantially the entire arcuate extent of said ring.

5. In a synchronizer clutch assembly adapted to form a releaseable driving connection between driving and driven members, a first clutch element connected to one of said members and having formed thereon external clutch teeth, a second clutch element connected to the other of said members and having formed thereon internal clutch teeth, a split synchronizer ring disposed adjacent said first clutch element, means for adjustably positioning said second clutch element axially into clutching engagement with said first clutch element, said second clutch element being engageable with the periphery of said synchronizer ring thereby establishing tangential friction forces, and means for transferring said friction forces to said first clutch element including radially flexible portions located within said synchronizer ring and yieldable radially in response to the application thereto of said tangential forces whereby supplementary synchronizer forces are applied to said synchronizer ring, said force transferring means comprising an undulated spring located within said synchronizer ring and having a plurality of apices engageable with the inner periphery of said ring.

6. In a synchronizer clutch assembly adapted to form a releaseable driving connection between driving and driven members, a first clutch element connected to one of said members and having formed thereon external clutch teeth, a second clutch element connected to the other of said members and having formed thereon internal clutch teeth, a split synchronizer ring mounted adjacent said first clutch element, said second clutch element being axially movable into clutching engagement with said first clutch element, said second clutch element being engageable with the periphery of said synchronizer ring when it is adjusted toward said first clutch element whereby tangential friction forces are established on said ring, a first abutment having portions located between the ends of said synchronizer ring, a second abutment located adjacent the first abutment and located at substantially the same arcuate position as said first abutment relative to the axis of said ring, said second abutment being connected to said first clutch element, and means for transferring the friction forces of said ring from said first abutment to said second abutment including radially yieldable portions that apply radial pressure to said synchronizer ring throughout substantially the entire arcuate extent of said ring, said force transferring means comprising an undulated spring situated within said synchronizer ring and having a series of apices engageable with the inner periphery of said ring, one end of said spring being engageable with said first abutment during synchronizing operation of said assembly and the other end of said ring being engageable with said second abutment.

7. In a synchronizer clutch assembly adapted to form a releaseable driving connection between driving and driven members, a first clutch element connected to one of said members and having formed thereon external clutch teeth, a second clutch element connected to the other of said members and having formed thereon internal clutch teeth, a split synchronizer ring mounted adjacent said first clutch element, said second clutch element being axially movable into clutching engagement with said first clutch element, said second clutch element being engageable with the periphery of said synchronizer ring when it is adjusted toward said first clutch element whereby tangential friction forces are established on said ring, a first abutment having portions located between the ends of said synchronizer ring, a second abutment located adjacent the first abutment and located at substantially the same arcuate position as said first abutment relative to the axis of said ring, said second abutment being connected to said first clutch element, means for transferring the friction forces of said ring from said first abutment to said second abutment including radially yieldable portions that apply radial pressure to said synchronizer ring throughout substantially the entire arcuate extent of said ring, said force transferring means comprising an undulated spring situated within said synchronizer ring and having a series of apices engageable with the inner periphery of said ring, one end of said spring being engageable with said first abutment during synchronizing operation of said assembly and the other end of said ring being engageable with said second abutment, and shoes situated within said synchronizer ring, one shoe being connected to each end of said spring, each shoe having a separate portion located in the line of arcuate motion of each abutment whereby tangential forces applied to one abutment can be transferred to the other through the spring.

8. In a synchronizer clutch assembly adapted to form a releasable driving connection between driving and driven members, a first clutch element connected to one of said members and having formed thereon external clutch teeth, a second clutch element connected to the other of said members and having formed thereon internal clutch teeth, a split synchronizer ring mounted adjacent said first clutch element, said second clutch element being axially movable into clutching engagement with said first clutch element, said second clutch element being engageable with the periphery of said synchronizer ring when it is adjusted toward said first clutch element whereby tangential friction forces are established on said ring, a first abutment having portions located between the ends of said synchronizer ring, a second abutment located adjacent the first abutment and located at substantially the same arcuate position as said first abutment relative to the axis of said ring, said second abutment being connected to said first clutch element, and means for transferring the friction forces of said ring from said first abutment to said second abutment including radially yieldable portions that apply radial pressure to said synchronizer ring throughout substantially the entire arcuate extent of said ring, said force transferring means comprising an undulated spring situated within said synchronizer ring and having a series of apices engageable with the inner periphery of said ring, one end of said spring being engageable with said first abutment during synchronizing operation of said assembly and the other end of said spring being engageable with said second abutment, the ends of said spring having separate portions that are engageable with said first abutment and said second abutment, respectively, whereby tangential forces applied to said first abutment can be distributed to said second abutment through said spring.

9. In a synchronizer clutch assembly adapted to form a releasable driving connection between said driving and driven members, a first clutch element carried by one of said members, a second clutch element carried by the other of said members, a split synchronizer ring disposed adjacent said first clutch element, said second clutch element being movable into frictional engagement with said synchronizer ring when it is moved toward said second clutch element whereby tangential friction forces are transmitted thereto, means for transferring said friction forces to said first clutch element including flexible portions located within said synchronizer ring and yieldable radially in response to the tangential forces applied thereto whereby supplementary synchronizer forces are applied to said synchronizer ring throughout substantially the entire arcuate extent of said synchronizer ring, said force transferring means comprising a series of yieldable spring elements located in end-to-end relationship about the axis of said synchronizer ring, said spring elements being arcuate in form with the apices of the arcs defined thereby being engageable with the inner periphery of said ring and yieldable in an outward direction when a tangential force is applied thereto.

10. The combination as set forth in claim 9 wherein said force transferring means includes further spacers located between adjacent ends of said spring elements, each spacer providing an anchor for the associated spring elements whereby the reaction forces that accompany the tangential forces applied to said spring elements are accommodated.

References Cited in the file of this patent
UNITED STATES PATENTS

| | | |
|---|---|---|
| 2,932,373 | Schmid | Apr. 12, 1960 |
| 3,020,991 | Altmann | Feb. 13, 1962 |